Patented Jan. 6, 1942

2,269,267

UNITED STATES PATENT OFFICE 2,269,267

PHONOGRAPH RECORD

James H. Hunter, Lansdowne, Pa., assignor to Radio Corporation of America, a corporation of Delaware No Drawing. Application May 31, 1938, Serial No. 211,083

3 Claims. (Cl. 260—41)

This invention relates to phonograph records and has for its principal object the provision of a novel record that affords improved quality of reproduction.

Many materials have heretofore been suggested for use in the manufacture of phonograph records. During recent years, there have been proposed for such use certain vinyl resins which are particularly advantageous. As is well known, it is very desirable to incorporate in moldable record materials various fillers in order to give body thereto. Also, it has been customary to incorporate a small quanity of carbon black as a pigment in order to make the material black.

In my copending application Serial No. 140,058, filed April 30, 1937, I have disclosed and claimed the use of carbon black as a filler instead of as a pigment, since carbon black is so very finely divided that its use as a filler, particularly with vinyl resins, produces a record composition from which high quality reproduction may be obtained. The conventional carbon black previously employed as a pigment is not entirely satisfactory as a filler for vinyl resins when used in large quantities, as it tends to make the material brittle. An important object of my present invention, therefore, is to provide an improved phonograph record having a carbon black filler, but which will be free from the foregoing objectionable feature.

More specifically, it is an object of my present invention to provide an improved phonograph record which will give high quality of reproduction but which will not become brittle regardless of any reasonable amount of carbon black filler employed.

Another object of my present invention is to provide an improved phonograph record as aforesaid which may be very easily compounded.

It is also an object of my present invention to provide an improved phonograph record, the cost of which will not exceed prior art records.

The foregoing and other objects of my invention, which will become apparent as the description proceeds, I accomplish by incorporating into the materials of which the records are made a substantial quantity of a filler consisting of low oil absorptive carbon black, as distinguished from the high oil absorptive carbon black used as a pigment in the prior art. The carbon black which I employ as a filler according to my present invention has an oil absorptive index of approximately 65, which means that it takes approximately 65 cc. of oil to wet down 100 grams of the carbon black, as compared with an oil absorptive index of approximately 130 for the carbon black pigment of the prior art. Since the low oil absorptive carbon black filler which I employ according to my present invention does not impart to the finished record the blackness that the conventional carbon black pigment does, I may, in addition, also employ a small quantity of the high oil absorptive carbon black solely as a pigment.

One example of a compound according to my present invention is as follows:

|  | Pounds |
|---|---|
| Vinyl resin | 278 |
| Low oil absorptive carbon black filler | 76 |
| High oil absorptive carbon black pigment | 19 |
| Calcium stearate | 6½ |
| Carnauba wax | 7½ |
| Holowax | 14 |

Materials having the above and other similar formulae may be readily compounded on rolls, as used in the production of rubber compounds, for example, or they may be made in a Banbury mixer. It will be noted that the ratio of low oil absorptive carbon black to high oil absorptive carbon black is four to one. However, this ratio may be varied over a considerable extent with satisfactory results.

It is to be understood that the foregoing formula is merely illustrative both as to the specific materials set forth and as to the quantities thereof employed. For example, in place of a vinyl resin base, other resins, either natural or synthetic, such as shellac, phenolic resins, resins derived from acrylic acid and its derivatives, urea resins, etc., may be employed, as may also other materials which become plastic under the action of heat, either with or without pressure, such as cellulose acetate and cellulose nitrate. The specific plasticizers and mold lubricants set forth above may also be varied considerably. In any event, it is to be noted that the low oil absorptive carbon black permits the use of relatively large quantities of carbon black without causing the finished composition or record to become brittle, as would be the case if other types of carbon black were employed.

Since many changes and modifications coming within the scope of my invention will, no doubt, readily suggest themselves to those skilled in the art, I desire that my invention shall not be limited except insofar as is made necessary by the prior art and by the spirit of the appended claims.

I claim as my invention:

1. A composition of matter comprising a moldable material having a resin base and a filler consisting of carbon black having an oil absorptive index of the order of 65.

2. A composition of matter comprising a moldable material having a resin base, a filler of relatively low absorptive carbon black, and a pigment consisting of a small quantity of relatively high oil absorptive carbon black, said filler having an oil absorptive index of the order of 65, and said pigment having an oil absorptive index of the order of 130.

3. A phonograph record comprising a moldable plastic material including as essential ingredients thereof a vinyl resin base, a filler of relatively oil absorptive carbon black, and a pigment of relatively high oil absorptive carbon black, said filler having an oil absorptive index of the order of 65, and said pigment having an oil absorptive index of the order of 130.

JAMES H. HUNTER.